US009187800B2

(12) United States Patent
Irick et al.

(10) Patent No.: US 9,187,800 B2
(45) Date of Patent: Nov. 17, 2015

(54) PROCESS CONTROL FOR POST-FORM HEAT TREATING PARTS FOR AN ASSEMBLY OPERATION

(71) Applicant: Ford Motor Company, Dearborn, MI (US)

(72) Inventors: Brett D. Irick, Dearborn, MI (US); Jerome A. Berendt, Brighton, MI (US); Richard J. Hare, Lincoln Park, MI (US); Stephen Kernosky, Livonia, MI (US); Laurent Bernard Chappuis, Grosse Ile, MI (US); James Engle, Chesterfield, MI (US)

(73) Assignee: Ford Motor Company, Dearborn, MI (US)

( * ) Notice: Subject to any disclaimer, the term of this patent is extended or adjusted under 35 U.S.C. 154(b) by 382 days.

(21) Appl. No.: 13/768,326

(22) Filed: Feb. 15, 2013

(65) Prior Publication Data

US 2014/0236336 A1 Aug. 21, 2014

(51) Int. Cl.
*G06F 19/00* (2011.01)
*C21D 9/00* (2006.01)
*B05D 3/02* (2006.01)
*C21D 11/00* (2006.01)

(52) U.S. Cl.
CPC ............ *C21D 9/0068* (2013.01); *B05D 3/0254* (2013.01); *C21D 11/00* (2013.01)

(58) Field of Classification Search
CPC ..... C21D 11/00; C21D 9/0068; B05D 3/0254
USPC .......................................................... 700/109
See application file for complete search history.

(56) References Cited

U.S. PATENT DOCUMENTS

| | | | | |
|---|---|---|---|---|
| 3,750,904 | A | 8/1973 | Wisler | |
| 4,827,423 | A * | 5/1989 | Beasley et al. | 700/96 |
| 5,728,241 | A | 3/1998 | Gupta et al. | |
| 6,126,730 | A * | 10/2000 | Yoshida et al. | 106/14.41 |
| 7,491,278 | B2 | 2/2009 | Kropfl | |
| 2005/0221514 | A1* | 10/2005 | Pasadyn et al. | 438/14 |
| 2007/0186417 | A1* | 8/2007 | Smyth | 29/894 |
| 2009/0272171 | A1* | 11/2009 | Golovashchenko | 72/348 |
| 2012/0237694 | A1* | 9/2012 | Lorentzen et al. | 427/551 |
| 2014/0236336 | A1* | 8/2014 | Irick et al. | 700/109 |

FOREIGN PATENT DOCUMENTS

| | | | | |
|---|---|---|---|---|
| KR | 20050119996 | A | 12/2005 | |
| WO | 2008059242 | A2 | 5/2008 | |
| WO | WO 2010032002 | A1 * | 3/2010 | C22F 1/00 |

OTHER PUBLICATIONS

IP.COM PriorArtDatabase, Post-Forming Heat Treatment of Aluminum Panels for High Strength Applications, www.ip.com, Feb. 3, 2010.

* cited by examiner

*Primary Examiner* — Michael D Masinick
(74) *Attorney, Agent, or Firm* — Raymond L. Coppiellie; Brooks Kushman P.C.

(57) ABSTRACT

A manufacturing process including a quality control procedure for verifying the completion of forming processes, heat treating and chemically treating parts. Sheet formed blanks, tubular blanks, extrusions and casting are traced through a manufacturing process from the time the parts are received. Metallurgical data relating to parts as received is recorded and marked on the parts. Forming data, heat treating data and chemical treating data may also be recorded by scanning and marking parts throughout the manufacturing process.

14 Claims, 1 Drawing Sheet

PROCESS CONTROL FOR POST-FORM HEAT TREATING PARTS FOR AN ASSEMBLY OPERATION

TECHNICAL FIELD

This disclosure relates to a method and system for controlling a manufacturing process that includes forming parts and artificially aging the parts after forming to increase the strength of the parts and/or chemically treating the parts for painting and other post-forming assembly operations.

BACKGROUND

There is substantial interest in reducing the weight of parts used to manufacture vehicles such as automobiles, trucks, airplanes and boats for the purpose of improving fuel economy. One approach to reducing the weight of parts is to use light weight/high strength aluminum alloys to manufacture parts. The yield strength of parts made of some aluminum alloys may be increased by aging the parts over a substantial period of time. Waiting for natural aging to occur is generally not economical feasible in manufacturing processes due to the long period of time required to strengthen the parts.

Aging may be accelerated by heating the parts in a process referred to as "artificial aging." For example, parts made of AA6xxx series aluminum may be artificially aged by heating the parts, for example to 225° C. for a period of 30 minutes to double the yield strength of the parts. After heating, the parts are cooled and may be chemically treated by applying a conversion coating and/or removal of oxidation from the surface of the parts in preparation for painting.

Parts made of aluminum alloys may be pre-formed in bending operations and hydro-forming operations. After forming, the parts may be trimmed, punched and de-burred before artificial aging to increase the yield strength. The parts are more malleable before artificial aging and easier to bend, hydro-form, cut and trim.

One problem with artificial aging is that it is impossible to determine by visual inspection whether the parts were subjected to the artificial aging process. A second problem is that raw material may have an age limit after which it cannot be reliably processed into a quality part. A tensile test may be used to verify the yield stress of a part but a tensile test is destructive to the part. While a hardness test could be used to test for artificial aging, hardness test results may not be an accurate predictor of yield stress, is time consuming, and adds expense to the manufacturing process.

Structural beams, such as pillars, roof rails, frame parts, and the like once assembled to a vehicle may be located in inaccessible areas that cannot be readily checked for yield strength. These types of structural parts may be in areas of the vehicle that are tested for crashworthiness such as bumper structures, passenger compartment beams and pillars, roof supports and the like. The yield strength of such parts may be critical to vehicle durability and/or vehicle quality. If it is determined that such structural parts lack the specified strength characteristics after the fact, replacing the parts is not easily accomplished and may result in scrapping the entire vehicle.

This disclosure is directed to solving the above problems and other problems as summarized below.

SUMMARY

According to one aspect of this disclosure, a manufacturing process is disclosed for a part made from a blank of age-hardenable material. As used in this application, the term "blank" may refer to a tubular member or may take the form of other structural shapes. The process comprises recording data relating to manufacture of the blank in a database, forming the blank into a part and recording part data relating to forming the part, and heat treating to artificially age the part and recording heat treating data relating to the time of treatment and the heating treating temperature to verify that the part meets strength specifications.

According to other aspects of the quality control process, the step of recording the blank data may further comprise scanning a bar code on the blank before the blank is formed into a part. The step of forming the blank into a part may further comprise bending the part and hydro-forming the part. The step of recording the part data includes recording data relating to forming the part and may further comprise recording the date and time of forming. The part may be marked after the forming step with a machine readable marking to identify the part with a number that correlates the part to the blank data from a raw material supplier.

According to further aspects of this disclosure, the part may be loaded into a rack of parts and the serial number part data may be recorded for each part in the rack. The parts may be locked into the rack to prevent removal or replacement of the parts prior to the heat treating step. The racks may have machine readable serial number identifiers. When locked, the part serial numbers of the part in the rack are then associated with the rack serial number. The heat treating data recorded in the heat treating step may include recording the temperature of an oven used to heat treat the part recording the duration of the heat treating step. A process pass/fail indicator may also be recorded that is based on a pre-validated heat treatment recipe.

Additional aspects of the disclosure may include chemically treating a rack of parts to apply a conversion coating and/or removing metal oxidation from the parts. Data may be recorded relating to a time of chemical treatment by recording the time that the chemical treatment begins and ends. Each of the parts may be marked with a machine readable marking after the chemically treating step to identify each part and correlate the part to the blank data, forming data, and heat treating data in the database before the parts are released from the rack.

According to another aspect of this disclosure, a manufacturing process is disclosed for creating a database to verify the metallurgical data, raw material birth dates, forming data, heat treating and chemical treating a plurality of parts. The manufacturing process begins with the step of selecting a blank formed of an age-hardenable material and recording blank data in a database relating to a metallurgical condition of the blank. The blank is formed and trimmed to form a part having a desired shape in a plurality of forming and trimming steps. Forming data relating to the completion of the forming and trimming steps is recorded in the database. The part is then heated to artificially age the part. Heating data relating to the time and the temperature of the heating step is recorded in the database. The part is then chemically treated to apply a conversion coating and/or removing metal oxidation from the part and data relating to the chemically treating step is recorded in the database.

According to other aspects of the manufacturing process, the process may also include marking the part with a first machine readable marking including the blank data, marking the part with a second machine readable marking including the forming data, marking the part with a third machine readable marking including the heating data, and marking the part with a fourth machine readable marking including the chemical treating data. Alternatively, this data can be added to the part history by use of the machine readable serial number on the part and stored on a computerized database system.

According to other aspects of the manufacturing process, the process may also include loading the part into a rack of a plurality of the parts after the forming and trimming step, locking the plurality of parts into the rack, heating all of the parts in the rack, and chemically treating all of the parts in the rack, and releasing the parts from the rack after chemically treating.

According to an alternative aspect of this disclosure as it relates to the manufacturing process, the parts may be marked with machine readable markings and locked into racks to facilitate verifying the completion of the manufacturing process. The process may begin by marking the part with a first machine readable marking including the blank data, marking the part with a second machine readable marking including the forming data and loading the part into a rack of a plurality of the parts after the forming and trimming step. The plurality of parts may be locked into the rack. The parts may be marked with a third machine readable marking including the heating data. The parts may also be marked with a fourth machine readable marking including the chemical treating data. The step of heating the part may include heating all of the parts in the rack, and the step of chemically treating the part may include chemically treating all of the parts in the rack and releasing the parts from the rack after the chemical treating step.

According to other aspects of this disclosure as it relates to the manufacturing process, the first, second, third and fourth machine readable markings are scanned to verify that each of the parts is made of a blank with acceptable metallurgical condition, formed and trimmed, heated to artificially age the part, and chemically treated.

According to another aspect of this disclosure as it relates to a different manufacturing process that does not involve heat treating or artificial aging, a manufacturing process is disclosed for creating a database to verify the metallurgical data, forming data, heat treating and chemical treating a plurality of parts. The manufacturing process begins with the step of selecting a blank and recording blank data in a database relating to a metallurgical condition of the blank. The blank is formed and trimmed to form a part having a desired shape in a plurality of forming and trimming steps. Forming data relating to the completion of the forming and trimming steps is recorded in the database. The part is then chemically treated to apply a conversion coating to the part and data relating to the chemically treating step is recorded in the database.

Another aspect of this disclosure is the ability to use the metallurgical and part serial number data to place holds on material to prevent them from being processed in downstream operations. The serial number data may also be used to release such holds on material.

The above aspects of this disclosure and other aspects will be described in greater detail below in the detailed description with reference to the attached drawings.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
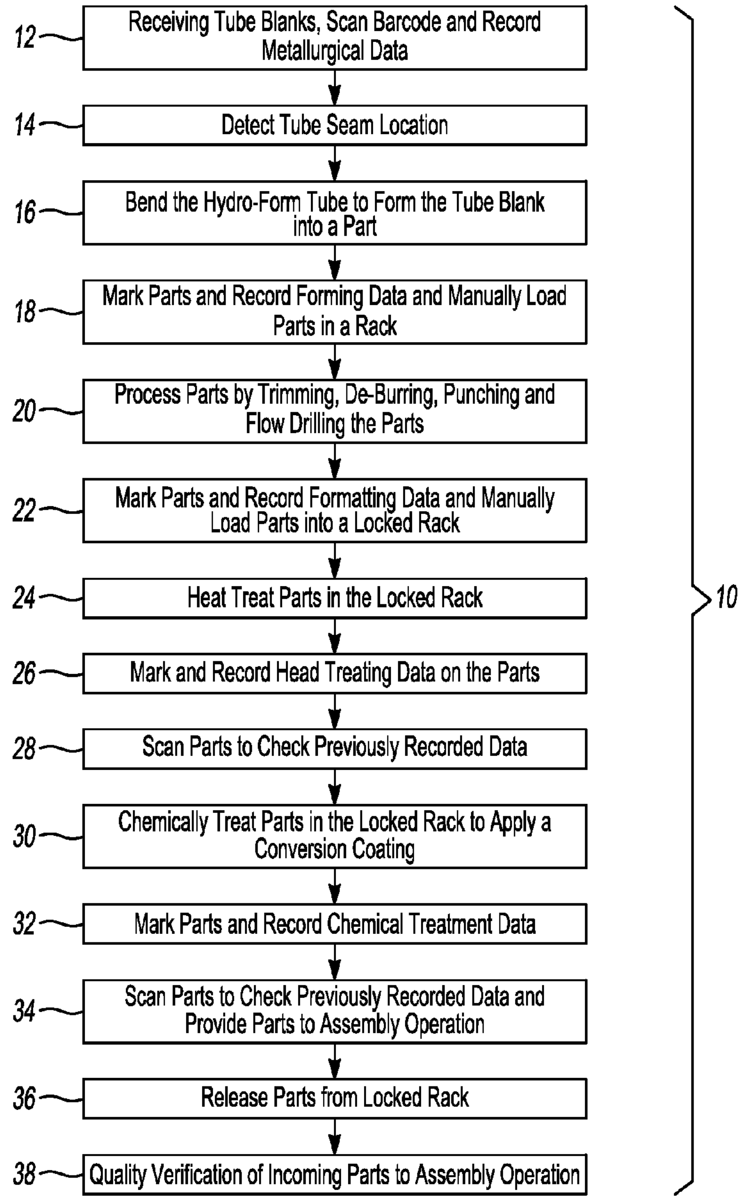
FIG. 1 is a flowchart illustrating a process for hydro-forming two blanks into parts that are heat treated and chemically treated to apply a conversion coating.

Referring to FIG. 1, a manufacturing process, including a quality control procedure for tracing the products made by the manufacturing process, is generally indicated by reference numeral 10. The manufacturing process in the illustrated embodiment is a hydro-forming process. The hydro-forming process begins at 12 with receiving the tube blanks. The tube blanks may be marked with a 2-D or 3-D bar code that may be provided by the manufacturer of the tube blanks. The bar codes include metallurgical data including the alloy used to make the tubular blank, the date of manufacture, and other information about the tube blank, such as the source of the blank and relevant test results.

In a hydro-forming process, it is advantageous to detect the tube seam location at 14 to assure that the tube is properly oriented for hydro-forming. The tube blank may then be bent to a general form and hydro-formed to form the tube blank into a part at 16. After bending and hydro-forming, the parts may be marked by a 2-D or 3-D bar bode to record forming data. The parts are then manually loaded into a parts rack at 18. The parts may be further processed by trimming, deburring, punching and flow drilling the parts at 20. The parts are marked at 22 and forming data may be recorded as the parts are manually loaded into a lockable rack.

The parts are heat treated while in the locked rack at 24. Parts made of heat treatable alloys, such as AA6xxx Series aluminum may be artificially aged and strengthened by heat treating after forming. The parts are normally received in T4 condition (naturally aged). AA6xxx alloys gain considerable strength when heat treated, for example, at a temperature of 225° C. for at least 30 minutes. The yield stress of AA6xxx alloys when treated at 225° C. for 30 minutes may increase from approximately 150 MPa to more than 280 MPa.

To verify that the parts have been sufficiently heated treated to artificially age the AA6xxx aluminum alloy parts, it is important to determine the duration of the heat treating step. The time that the heat treating begins and the time that the heat treating ends is recorded to determine the duration of the heat treating process at 26. The temperature of the oven or heater used to heat treat the part is also recorded during the heat treating cycle to assure that the parts are sufficiently strengthened. The heat treating data is recorded and marked on the parts in a 2-D or 3-D bar code. During this time, the parts are retained in the locked rack. The parts may be scanned to check the previously recorded data at 28.

The parts are then taken in the locked rack to be chemically treated. The parts are chemically treated while in the locked rack to apply a conversion coating to the parts at 30. The parts are marked and the chemical treatment data, including the duration of chemical treatment, temperature and other relevant parameters, are marked on the parts at 32 and recorded in a database.

The parts are then scanned to check previously recorded data and the parts are provided to an assembly operation at 34. The parts are released from the locked rack at 36 and may be provided to the assembly operation. By recording the metallurgical data, forming data, heat treating data and chemical treatment data in a database, it can be positively determined that the parts were made from tube blanks that have been properly formed, heat treated and chemically treated to meet manufacturing process specifications. Downstream operations may read the serial number of each part and query the data base. An automated process may be programmed to not process the part if the database indicates that the part has failed any or all of the upstream operations.

The parts may then be provided to an assembly operation. Incoming parts to the assembly operation are subject to quality verification at 38.

Figure 2:
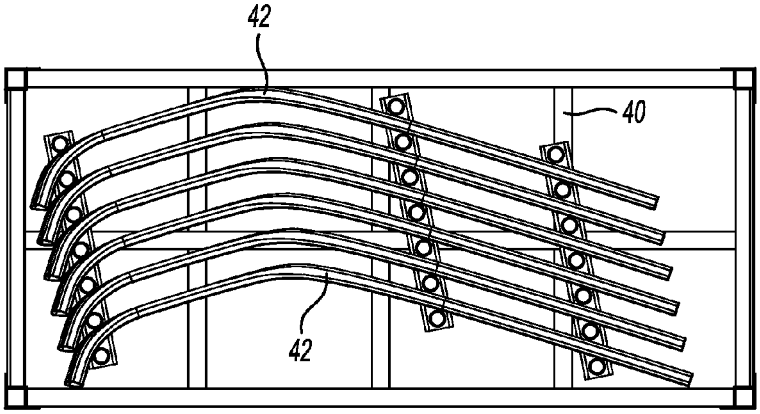
FIG. 2 is an elevation view of a rack used in a manufacturing process for hydro-forming tubular blanks to form parts that are heat treated for artificial aging and subsequently chemical treatment to apply a conversion coating.

Referring to FIG. 2, a rack 40, including a plurality of hydro-formed parts 42, is illustrated. It should be understood that a wide variety of parts may be retained in specialized racks. The parts must be separated from each other in the rack to permit circulating the hot air in the heat treating oven to evenly heat the parts.

While the above process is described with reference to hydro-formed parts, it is also anticipated that the processes described with reference to hydro-formed parts may also apply to stampings, extrusions and castings formed of heat treatable alloys, such as the AA6xxx series alloys.

It should also be understood that the process described above includes a heat treating step that may not be necessary for all parts. For example, in parts that do not require increased yield stress, the heat treating step may be omitted. If so, the above process will be modified by eliminating the step of heat treating the parts of the locked rack at 24 and marking and recording heat treating data on the parts at 26. The above process may be used to assure that the tube blanks as received conform to metallurgical standard and that the forming data reflects that all of the manufacturing processes have been completed prior to locking the parts in the locked rack. The parts are then chemically treated while remaining in the locked rack to apply a conversion coating. After conversion coating, the parts are marked and data is recorded to permit verification that the parts are manufactured to the part specifications. The parts are marked with a 2-D or 3-D bar code before being released from the locked rack to assure that the parts used in the subsequent assembly operation meet all relevant product specifications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A manufacturing process for a part comprising:

recording blank data relating to a blank in a database;

forming the blank into the part and recording part data;

securing several parts to a rack to prevent removal or replacement of the parts during the process; and heat treating to artificially age the parts and recording heat treating data relating to a treatment time and a heat treating temperature to verify that the part is hardened.

2. The process of claim 1 wherein the step of recording the blank data further comprises scanning a bar code on the blank before the blank is formed into a part.

3. The process of claim 1 wherein the step of forming the blank into a part further comprises bending the part and hydro-forming the part and wherein recording the part data includes recording data relating to forming the part.

4. The process of claim 1 further comprising:

marking the part with a machine readable marking after the forming step to identify the part and correlate the part to the blank data.

5. The process of claim 1 wherein the heat treating data recorded in the heat treating step includes recording the temperature of an oven used to heat treat the part, recording the time that the heat treating begins and ends.

6. A manufacturing process for a part made from a blank of age-hardenable material, the process comprising:

recording blank data relating to the blank in a database;

forming the blank into a part and recording part data relating to forming the part; and heat treating to artificially age the part and recording heat treating data relating to a time of treatment and a temperature of the heat treating to verify that the part is hardened;

chemically treating a rack of parts to apply a conversion coating to the parts and recording data relating to a time of chemical treatment by recording the time that the chemical treatment begins and ends;

marking each of the parts with a machine readable marking after the chemically treating step to identify each part and correlate the part to the blank data, forming data, and heat treating data in the database; and releasing the parts from the rack.

7. A part manufacturing process comprising:

selecting a blank formed of an age-hardenable material and recording blank data in a database relating to a metallurgical condition of the blank;

marking the part with a first machine readable marking including the blank data;

forming and trimming the blank into a part having a desired shape in a plurality of forming and trimming steps and recording forming data relating to the completion of the forming and trimming steps in the database;

marking the part with a second machine readable marking including the forming data;

heating the part to artificially age the part and recording heating data relating to a time and a temperature of the heating step in the database;

marking the part with a third machine readable marking including the heating data;

chemically treating the part to apply a conversion coating to the part and recording chemical treating data relating to the chemically treating step in the database; and marking the part with a fourth machine readable marking including the chemical treating data.

8. The process of claim 7 further comprising:

marking the blank with a serial number at some time point in the manufacturing process; and storing the treating data on a computerized database to track the processing status of each part.

9. A part manufacturing process comprising:

selecting a blank formed of an age-hardenable material and recording blank data in a database relating to a metallurgical condition of the blank;

forming and trimming the blank into a part having a desired shape in a plurality of forming and trimming steps and recording forming data relating to the completion of the forming and trimming steps in the database;

loading the part into a rack with a plurality of other parts after the forming and trimming step;

locking the plurality of parts into the rack;

heating the part to artificially age the part and recording heating data relating to a time and a temperature of the heating step in the database, wherein the step of heating the part includes heating all of the parts in the rack, and wherein the step of chemically treating the part includes chemically treating all of the parts in the rack; and releasing the parts from the rack after chemically treating.

10. A part manufacturing process comprising:

selecting a blank formed of an age-hardenable material and recording blank data in a database relating to a metallurgical condition of the blank;

marking the part with a first machine readable marking including the blank data;

forming and trimming the blank into a part having a desired shape in a plurality of forming and trimming steps and recording forming data relating to the completion of the forming and trimming steps in the database;

marking the part with a second machine readable marking including the forming data;

loading the part into a rack with a plurality of other parts after the forming and trimming step;

locking the plurality of parts into the rack;

heating the part to artificially age the part and recording heating data relating to a time and a temperature of the heating step in the database;

marking the part with a third machine readable marking including the heating data;

chemically treating the part to apply a conversion coating to the part and recording chemical treating data relating to the chemically treating step in the database;

marking the part with a fourth machine readable marking including the chemical treating data;

wherein the step of heating the part includes heat all of the parts in the rack, and wherein the step of chemically treating the part includes chemically treating all of the parts in the rack; and releasing the parts from the rack after chemically treating.

11. The process of claim 10 further comprising:

scanning the first, second, third and fourth machine readable markings to verify that each of the parts is made of a blank with acceptable metallurgical condition, formed and trimmed, heated to artificially age the part, and chemically treated.

12. A manufacturing process comprising:

selecting a blank, recording blank data in a database relating to a metallurgical condition of the blank and marking the part with a first machine readable marking including the blank data;

forming and trimming the blank into a part having a desired shape in a plurality of forming and trimming steps, recording forming data relating to the completion of the forming and trimming steps in the database, marking the part with a second machine readable marking including the forming data; and chemically treating the part to apply a conversion coating to the part, and recording treating data relating to the chemically treating step in the database and marking the part with a third machine readable marking including the treating data.

13. A manufacturing process comprising:

selecting a blank and recording blank data in a database relating to a metallurgical condition of the blank;

forming and trimming the blank into a part having a desired shape in a plurality of forming and trimming steps and recording forming data relating to the completion of the forming and trimming steps in the database;

loading the part into a rack with a plurality of other parts after the forming and trimming step;

locking the plurality of parts into the rack;

chemically treating the part to apply a conversion coating to the part and recording treating data relating to the chemically treating step in the database;

wherein the step of chemically treating the part includes chemically treating all of the parts in the rack; and releasing the parts from the rack after chemically treating.

14. The process of claim 13 further comprising:

scanning the first, second, and third machine readable markings to verify that each of the parts is made of a blank with acceptable metallurgical condition, formed and trimmed, and chemically treated.

* * * * *